US012748443B2

(12) United States Patent
Mudd et al.

(10) Patent No.: US 12,748,443 B2
(45) Date of Patent: Sep. 29, 2026

(54) VALVE ASSEMBLY AND SYSTEM USED TO CONTROL FLOW RATE OF A FLUID

(71) Applicant: Illinois Tool Works Inc., Glenview, IL (US)

(72) Inventors: Daniel T. Mudd, Freemont, CA (US); Andrew Staudt, Freemont, CA (US); Mohamed Saleem, Freemont, CA (US); Sukhjeet Singh, Freemont, CA (US); Thomas Kotowski, Freemont, CA (US)

(73) Assignee: Illinois Tool Works Inc., Glenview, IL (US)

( * ) Notice: Subject to any disclaimer, the term of this patent is extended or adjusted under 35 U.S.C. 154(b) by 391 days.

(21) Appl. No.: 18/382,342

(22) Filed: Oct. 20, 2023

(65) Prior Publication Data

US 2025/0130600 A1 Apr. 24, 2025

(51) Int. Cl.
*G05D 7/06* (2006.01)
*G01F 15/00* (2006.01)
*G01F 15/02* (2006.01)

(52) U.S. Cl.
CPC ......... *G05D 7/0635* (2013.01); *G01F 15/005* (2013.01); *G01F 15/024* (2013.01)

(58) Field of Classification Search
CPC ... G05D 7/0635; G01F 15/005; G01F 15/024; G01F 1/36; G01F 1/40; G01F 1/363; G01F 1/88; G01F 1/86; G01F 15/16; F16K 37/005; F16K 31/02
See application file for complete search history.

(56) References Cited

U.S. PATENT DOCUMENTS 5,868,159 A * 2/1999 Loan .................... G05D 7/0635 137/486
6,962,164 B2 11/2005 Lull et al.
2002/0082783 A1* 6/2002 Grosshart ............ G05D 7/0635 702/50

(Continued)

FOREIGN PATENT DOCUMENTS

EP 1442343 8/2004

OTHER PUBLICATIONS

European Office Communication with extended search report Appln No. 24205005.2 dated Feb. 27, 2025.

*Primary Examiner* — Christopher E. Everett
(74) *Attorney, Agent, or Firm* — McAndrews Held & Malloy, Ltd.

(57) ABSTRACT

A mass flow meter includes a flow pathway through the mass flow meter, wherein the flow pathway comprises a first cavity and a second cavity. The mass flow meter also includes a laminar flow element adjacent to the first cavity and the second cavity, wherein the first cavity is upstream of the laminar flow element and the second cavity is downstream of the laminar flow element. A pressure transducer is positioned in at least one of the first cavity or the second cavity, wherein the pressure transducer includes at least one diaphragm and measures linear and non-linear responses of the at least one diaphragm to a first pressure to determine a voltage signal indicative of a pressure. The mass flow meter converts the pressure reading obtained from the pressure transducer into a signal indicative of a mass flow rate through the laminar flow element.

16 Claims, 10 Drawing Sheets

(56) References Cited

U.S. PATENT DOCUMENTS

| | | | | |
|---|---|---|---|---|
| 2002/0174898 | A1* | 11/2002 | Lowery ................ | G05D 7/0635 137/487.5 |
| 2006/0037644 | A1* | 2/2006 | Nishikawa ........... | G05D 7/0641 137/487.5 |
| 2007/0089789 | A1* | 4/2007 | Mudd .................. | G05D 7/0635 137/487.5 |
| 2008/0202248 | A1 | 8/2008 | Tojo | |
| 2009/0095068 | A1* | 4/2009 | Redemann ........... | G05D 7/0635 73/202 |
| 2010/0080262 | A1* | 4/2010 | McDonald ................ | G01F 5/00 374/166 |
| 2013/0118265 | A1 | 5/2013 | Besling | |
| 2019/0204128 | A1* | 7/2019 | Somani ................... | G01F 1/692 |
| 2019/0235533 | A1 | 8/2019 | Lull | |
| 2020/0400470 | A1 | 12/2020 | Mudd | |
| 2022/0390269 | A1 | 12/2022 | Hidaka | |

* cited by examiner

MODEL INPUT FOR 5 PSIA LFS SENSOR SIMULATION

| | LINEAR | | | | |
|---|---|---|---|---|---|
| | FULL SCALE | DRIFT/YR | USE TO | DRIFT/YR | USE TO |
| | PSIA | %FS | %LFS | PSIA | PSIA |
| P1 XDR | 5 | 0.050% | 760% | 0.0025 | 38 |
| P2 XDR | 5 | 0.050% | 760% | 0.0025 | 38 |
| POWER | 2 | RESTRICTOR POWER: 2=COMPRESSIBLE FLOW | | | |

MAX FLOW AT P1+1900 TORR (38 PSIA)
TYPICAL OUTLET PRESSURE, P2=150 TORR
MAX OUTLET PRESSURE, P2=400 TORR

PRESSURE SENSITIVITY (MV/PSI) VARIES FROM 4 TO 14 BETTER ON THE NL SENSOR BUT ANNUAL DRIFT IS SIMILAR. THE NL SENSOR SENSITIVITY IS ALSO 4X BETTER AT LOW PRESSURES SO ZERO DRIFT DOES NOT AFFECT FLOW DRIFT / YEAR (MV/YEAR) AS MUCH AT THE LOWER FLOWS, MFC'S 1% ACCURACY/STABILITY RANGE IS MUCH IMPROVED.

VALVE ASSEMBLY AND SYSTEM USED TO CONTROL FLOW RATE OF A FLUID

BACKGROUND

Equipment used in the manufacture of semiconductor wafers are required to operate with a high degree of precision in order to maintain desired production yields. In a process to create integrated circuits, semiconductor wafers are treated within a process chamber using certain chemicals. Mass Flow Controllers (MFCs) are used to deliver these chemicals to the process chamber in a consistent manner and with a precise flow rate. This can be significantly challenging as the MFCs are required to hold very tight accuracies, operate at multiple set points and constantly shutdown and restart during the wafer manufacturing process. In order to manage such accuracies, current state of the art MFC's are equipped with processor based control units, a multitude of sensors, and an advanced diagnostics system.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

Figure 1:
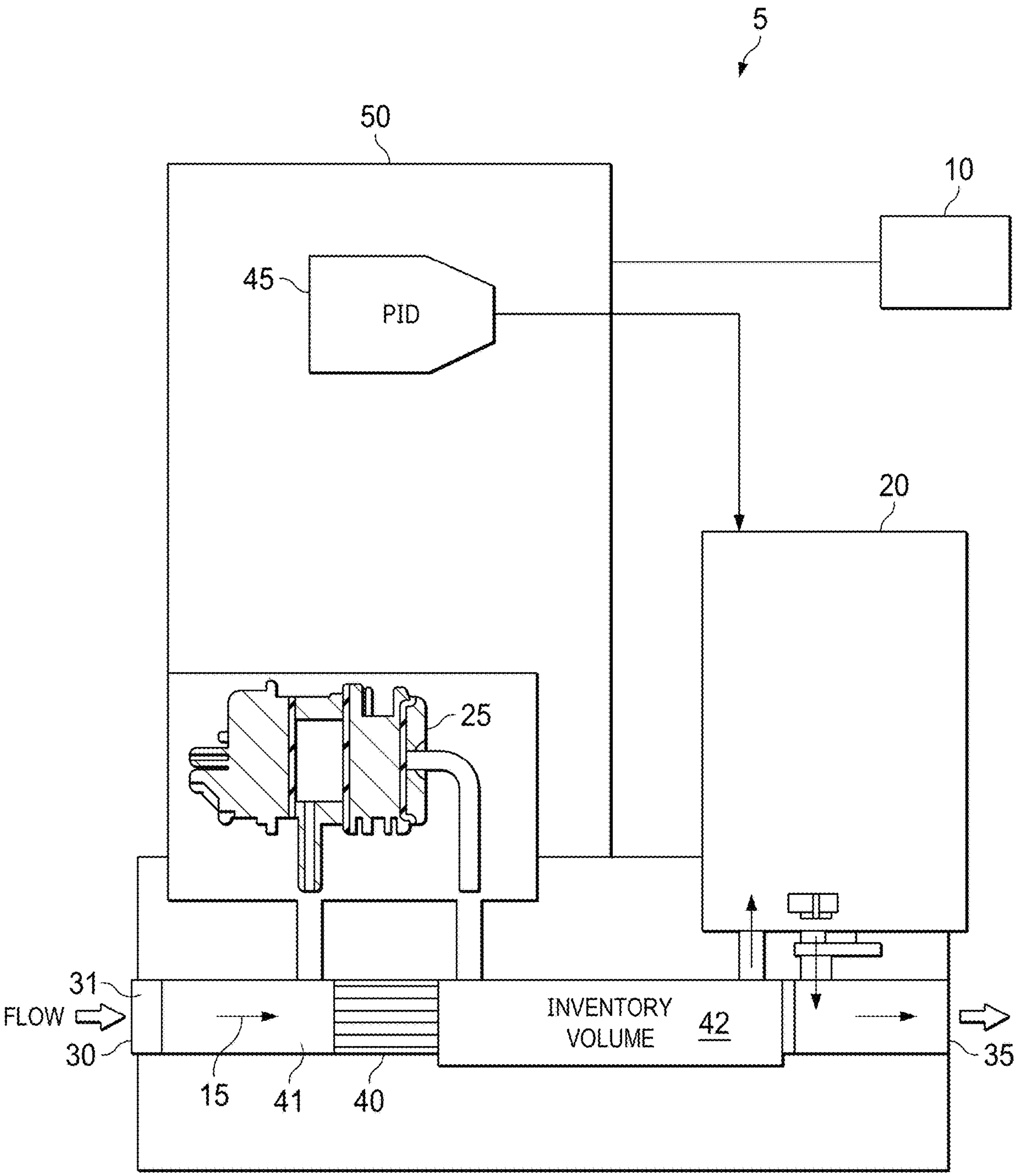
FIG. 1 is an illustration of a schematic of a pressure-based mass flow controller with a flow sensor upstream of the valve in accordance with certain embodiments of the present disclosure.

The illustrated figures are only exemplary and are not intended to assert or imply any limitation with regard to the environment, architecture, design, or process in which different examples may be implemented.

DETAILED DESCRIPTION

The present invention relates generally to methods and systems for controlling the mass flow rate of a fluid, and more particularly to the operation of mass flow controllers (MFCs) and mass flow meters (MFMs) for gases and other compressible or incompressible fluids. The term "fluid" is used herein to describe any type of matter in any state capable of flow. The term "gas" is used herein to describe any fluid for which density is substantially dependent on absolute pressure, such as ideal or non-ideal gases, vapors, and supercritical fluids. The term "liquid" is used herein to describe any fluid for which density is not substantially dependent on absolute pressure.

Diaphragms are used in pressure sensors to convert a deflection caused by the pressure exerted on a diaphragm into a voltage signal used by an MFC to calculate flow rate. A pressure sensor's overpressure rating is the maximum pressure the device can experience without introducing material calibration shift. The over pressure rating of pressure sensors are typically 4 times the full-scale rating. The full-scale rating has historically been the point where the PT displays 1% TBNL. Many modern pressure sensors are fabricated by utilizing semiconductor fabrication methods to form markedly smaller silicon diaphragms with piezo restrictive elements located on high strain locations on the silicon diaphragm. Silicon, being a single crystal, is an effective material for diaphragm applications. According to the teachings of the present invention, with appropriately tailored designs, silicon based diaphragms can be deflected well past the linear pressure deflection range (a primarily bending-based mechanism) into an extended non-linear pressure deflection range (a primarily membrane-based mechanism) without the onset of material localized dislocation or stress risers, which can cause yielding and a permanent calibration shift.

The teachings of certain embodiments of the present invention allow the implementation of an improved MFC that utilizes pressure sensors that provide a large ratio of maximum overpressure to annual zero drift, independent of the linearity of the signal. This ratio determines the annual stable dynamic range of a pressure based MFC. The magnitude of the annual pressure transducer zero drift is the primary cause of long-term pressure measurement errors at lower flow rates and determines the minimum flow where the flow error of an MFC is acceptable for use. The annual drift of a pressure transducer is generally a percentage of its linear full scale. An annual drift of 0.05% of the dominantly linear full scale, measurement per year is generally acceptable in the industry. If the same transducer can be used, as demonstrated by embodiments of the present invention, in the non-linear region with, for example, pressure readings at 10 times its linear limit (without material damage), then the annual drift while 0.05% of linear full scale would only be 0.005% of its maximum overpressure or non-linear full scale. Thus, by utilizing a non-linear region of a transducer, an MFC implemented according to the teachings of the present invention will significantly increase its annual stability relative to its maximum operating range, thereby markedly improving the performance and value of the MFC. As another advantage, due to the increased operating range of the MFC of various embodiments of the current invention, a single MFC may replace two conventional MFCs.

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure.

Unless otherwise indicated, all numbers expressing quantities of components, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the examples of the present invention. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges some lower limits listed may be greater than some upper limits listed. One skilled in the art will recognize that the selected subset will require the selection of an upper limit in excess of the selected lower limit. Further, although voltage signals discussed herein are discussed as positive voltages, a negative voltage signal or differential voltage signal may be generated, used, or detected without departing from the scope of the present invention.

Presented herein is a valve assembly for controlling fluid flow rate. The valve assembly comprises a valve block having an upstream reservoir, a downstream reservoir and a valve seat for communicating fluid from an upstream location to a downstream location. The valve assembly further comprises a stand-alone valve having a moveable member, a sensor chip package having at least one sensor coupled with the stand-alone valve, and a controller interface. The controller interface sends at least one measured parametric value provided by the at least one sensor and receives a control signal that is used to adjust valve stroke of the stand-alone valve. The control signal is determined based on the at least one measured parametric value.

Also presented herein is a fluid processing system for use in a manufacturing facility. The fluid processing system comprises a valve block, a stand-alone valve, an upstream fluid source fluidly coupled to the stand-alone valve, a downstream process tool fluidly coupled to the stand-alone valve, and a control unit. Upstream or upstream side, as used herein, refers to a location or side closest to a fluid source, e.g. after an upstream valve or before a downstream valve in an MFC. Downstream or downstream side, as used herein, refers to the location or side farthest from a fluid source.

The valve block includes an upstream reservoir, a downstream reservoir and a valve seat for communicating fluid from an upstream location to a downstream location. The stand-alone valve having a moveable member and a sensor chip package having at least one sensor coupled with the valve. The control unit includes an interface that is communicable coupled to the stand-alone valve and the sensor chip package. The control unit generates a control signal that is used to control stroke of the stand-alone valve based on at least one parametric value from the sensor chip package.

FIG. 1 illustrates a schematic of a pressure-based mass flow controller (MFC) 5 with a flow sensor upstream of the valve in accordance with certain embodiments of the present disclosure. The MFC 5 operates on the principle that changes in fluid flow rate produce changes in the fluid pressure upstream and/or downstream of a flow restrictor, such as a laminar flow element, from which the fluid flow rate may be calculated.

In the depicted embodiment, the MFC 5 comprises a power supply connector 10, a flow pathway 15, a flow control valve assembly 20, and at least one embodiment of a combination absolute and differential pressure transducer assembly 25. The MFC 5 further comprises an inlet port 30 for introducing a fluid into the device and an outlet port 35 from which the fluid exits (e.g., to a processing chamber) and a laminar flow element 40. In some embodiments, inlet port 30 may further comprise an inlet orifice block 31 disposed within inlet port 30 and blocking at least a portion of fluid flow therethrough. Fluid may enter MFC 5 via the inlet port 30 and flow within the MFC 5 along the flow pathway 15. In some embodiments, the flow pathway 15 may be maintained at a constant temperature. The flow control valve assembly 20 is positioned along the flow pathway 15 proximate the outlet port 35 and downstream of both the combination absolute and differential pressure transducer assembly 25. The flow control valve assembly 20 may comprise a proportional control valve (e.g., a solenoid or piezo control valve) that is adjustable to control the amount of fluid passing through the MFC 5. The flow control valve assembly 20 may actuate the control valve at any desired rate sufficient for controlling flow through the flow control valve assembly 20. Further, the actuation rate may be programmable and adjustable so that the control valve may be actuated continuously or in a stair-step process.

Continuing with FIG. 1, the MFC 5 further comprises a proportional-integral-derivative (hereafter "PID") controller 45 that may comprise logic, circuitry, memory, and one or more processing elements (processors). Although a PID controller is illustrated in this specific example, it is to be understood that the PID controller is but one of many potential valve controllers as will be readily apparent to one of ordinary skill in the art. For example, in some embodiments, the PID controller 45 may be substituted for a lead-lag controller, a gain-lead-lag controller (e.g., as described in U.S. Pat. No. 6,962,164 incorporated in its entirety by reference herein), or any other controller sufficient for the application. The controller may be implemented as either hardware or firmware. The PID controller 45 is configured to control the position of the valve within the flow control valve assembly 20 in accordance with a setpoint indicating the desired mass flow rate. For instance, in one embodiment the PID controller 45 receives the absolute pressure and the differential pressure from the combination absolute and differential pressure transducer assembly 25 and a setpoint signal indicative of a desired flow rate through the laminar flow element 40. The PID controller 45 uses the received information to convert the absolute pressure, the differential pressure, and knowledge of both the fluid properties and characteristics of the laminar flow element 40 into a signal indicative of the mass flow rate through the laminar flow element 40. For example, in one embodiment the PID controller 45 relates the pressure drop to a volumetric flow rate, which may then be converted to a mass flow rate using density correction at a given temperature and pressure. The PID controller 45 may then generate a valve drive signal for controlling the flow control valve assembly 20 such that the signal indicative of mass flow rate through the laminar flow element 40 substantially matches the received setpoint signal. For example, in one embodiment a control valve drive signal is generated based upon an error signal that is the difference between the set point signal indicative of the desired mass flow rate of the fluid and a feedback signal that is related to the actual mass flow rate determined by the PID controller 45 using the combination absolute and differential pressure transducer assembly 25. In some examples a desired flow rate of the setpoint signal is less than or equal to 10%. In some examples, the outlet pressure may be above about 2 psia.

In one embodiment a circuit board 50 may be attached to the back of the combination absolute and differential pressure transducer assembly 25. In certain embodiments the circuit board 50 may include flash memory and a flex cable connector. The circuit board 50 may also provide a location to mount any transducer-specific balance or other trim resistors. In some embodiments the circuit board 50 may have memory components that are configured to store data such as, but not limited to, calibration data for the combination absolute and differential pressure transducer assembly 25. The circuit board 50 may include one or more accelerometers to allow automatic correction for the effects of gravity or acceleration on the measured pressures. The circuit board 50 may also include instrumentation amplifiers or other amplifiers configured to amplify output signals of the absolute pressure transducer and the differential pressure transducer, as well as other components. The circuit board 50 may be supported by pins from the combination absolute and differential pressure transducer assembly 25 providing the electrical connections with the absolute and differential pressure transducers contained within the combination absolute and differential pressure transducer assembly 25. In one embodiment of the present invention, at least one of the pressure sensors making up pressure transducer assembly 25 is operable to generate a voltage reading in response to both linear and non-linear changes to a diaphragm of the pressure sensor. In another embodiment of the present invention, at least one of the pressure sensors making up pressure transducer assembly 25 is operable to generate a voltage reading in response to non-linear changes to a diaphragm of the pressure sensor. In yet another embodiment of the present invention, at least one of the pressure sensors making up pressure transducer assembly 25 is operable to generate a voltage reading in response to pressure that falls within the non-linear region of operation of a diaphragm of the pressure sensor.

Figure 2:
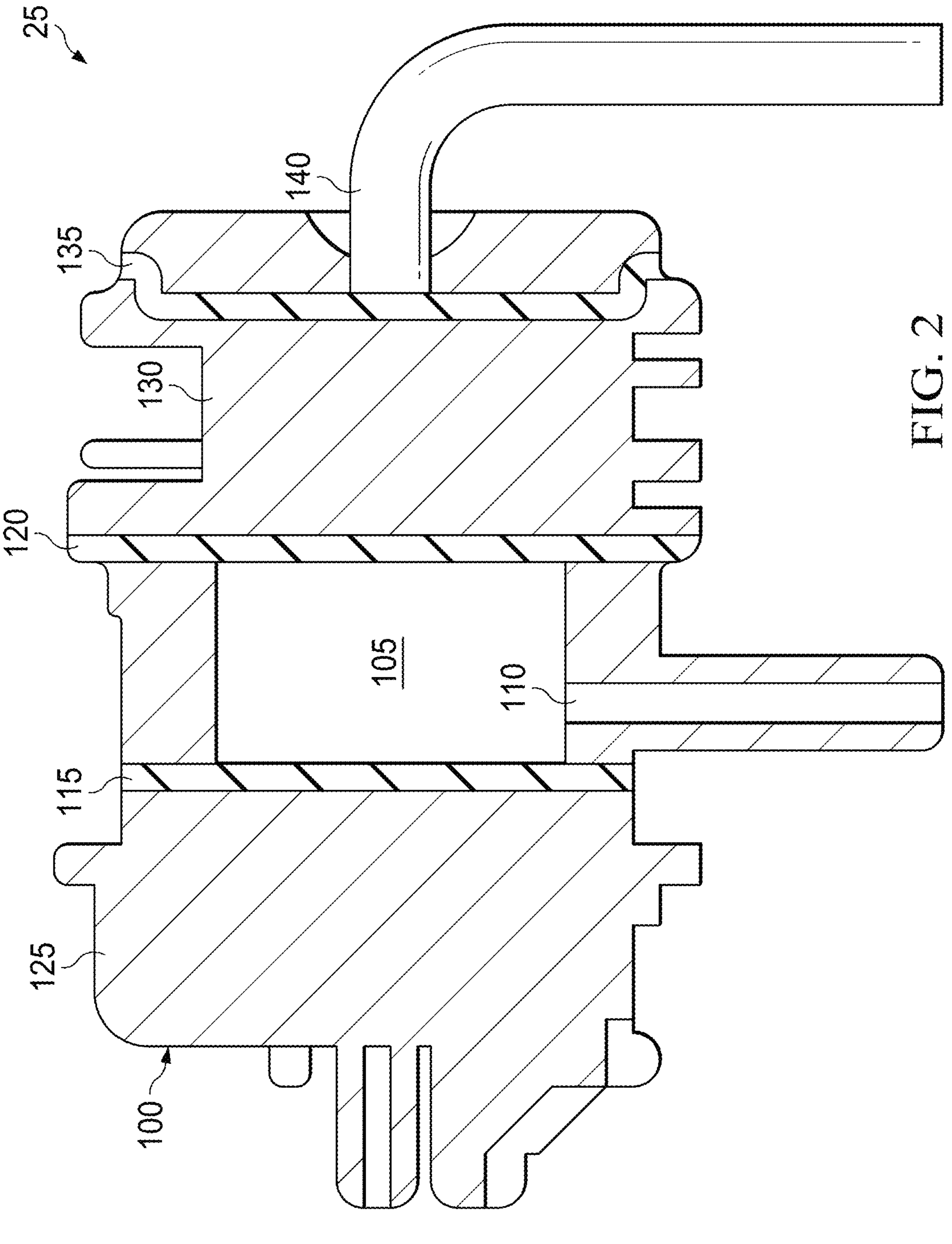
FIG. 2 is an illustration of a schematic of a combination absolute and differential pressure transducer assembly in accordance with certain embodiments of the present disclosure.

FIG. 2 illustrates an alternative embodiment of an MFC, generally 305. MFC 305 is substantially similar to MFC 5 of FIG. 1; however, the combination absolute and differential pressure transducer assembly 25 of FIG. 1 has been substituted with a differential pressure transducer assembly 310 which comprises an upstream differential pressure membrane, downstream differential pressure membrane, and a differential pressure transducer similar to the upstream differential pressure membrane 120, downstream differential pressure membrane 135, and a differential pressure transducer 130. However, in this particular embodiment, there is no absolute pressure transducer co-located with the differential pressure transducer. Instead, the absolute pressure transducer may be positioned separate from the differential pressure transducer assembly 310 at a position upstream of the laminar flow element 40, for example, at position 315 in fluid communication with feed volume 41; or, alternatively at a position downstream of the laminar flow element 40, for example, at position 320 in fluid communication with inventory volume 42.

In general, the error in the pressure reading of a pressure sensor determines that smallest flow rate that the pressure sensor can be used to adequately measure flow. More particularly, smaller flow rates produce smaller pressure signals and eventually erroneous non-flow induced signals, such as annual sensor zero drift, become larger and eventually problematic. As one cannot distinguish between the shrinking pressure induced signal (as flow rates become smaller) and the erroneous non-pressure induced signals, the flow calculation based on the combined signal becomes increasingly inaccurate to the point where it is no longer is adequate for use. For example, a 5 psi 1% best fit straight line test pressure transducer capable of being used into a non-linear region to 50 psi, can be paired with a flow restrictive element to achieve full flow at 50 psi. As the absolute error of the sensor is 0.05% of 5 psi (linear rating) but the sensor will see 50 psi at full flow, the absolute error of the sensor will be 0.005% of the 50 psi use pressure and the MFC will have 10 times less flow error as compared to the % full scale use range of a conventional 5 psi 1% best fit line test pressure transducer that cannot be used past its 5 psi rating. As discussed, such use is limited by potential damage due to its diaphragm design at higher psi, which must be paired with a less restrictive flow element that produces full scale flow at 5 psi full scale. For purposes of the foregoing, error is defined as pressure measurement err of a pressure transducer divided by the full scale use range ("FSUR"), or % FSUR.

Since the pressure range a pressure sensor can measure accurately is directly associated with the range of flows that can be accurately measured by a mass flow controller using the pressure sensor, mass flow controllers that utilize NL sensors with maximum use pressures can a measure high flow rates and will have lower percentages of error, or % FSUR, relative to measured flow rates than mass flow controllers that are limited to the lower maximum pressures of their 1% best fit straight line value when measuring flow rates.

The designed flow rate range operation, in one embodiment at 1% of reading accuracy, of a mass flow controller is referred to herein as the flow accuracy range. As discussed above, in current MFCs, this is typically defined around the dominantly linear operating range of a pressure sensor, i.e., when the linear response of a pressure sensor dominates any non-linear response. At flow rates above or below such flow accuracy range, the flow measurement will be less accurate. For example, traditionally a mass flow controller may be able to measure flows accurately from between 10 and 100 sccm using the linear range of a pressure sensor that is able to measure pressures accurately between 0.5 and 5 psi. Similarly, traditionally a mass flow controller may be able to measure flows accurately from between 100 and 1000 sccm using the linear range of a pressure sensor that is able to measure pressures accurately between 5 and 50 psi.

In one embodiment of the current invention, a laminar flow element is designed to accurately operate over both the 0.5 to 5 psi and the 5 to 50 psi range using a pressure transducer that suffers no material damage when operating at pressures between 0 and 50 psi where the performance of the pressure transducer is increasingly dominated by its non-linear characteristics as pressure increases. More particularly, differential pressure transducer assembly 310 includes at least one pressure transducer designed to operate in the linear and non-linear range of a diaphragm included within the transducer. Thus, in one embodiment of the current invention, using such a pressure transducer, a single MFC may be designed with a flow accuracy range that covers a flow range of 10 to 1000 sccm, allowing a novel MFC to replace two conventional MFCs previously necessary to cover the same flow range. As used in this specification, linear range or a linear region refers to a range of pressure in which the linear characteristics of a pressure sensor/transducer dominate the non-linear characteristics of the pressure sensor/transducer. While non-linear characteristics of the pressure sensor/transducer may still exist, they are generally less material than the linear characteristics. Conversely, the non-linear range or region refers to a range of pressure in which the non-linear characteristics of a pressure sensor/transducer becomes significant compared to the linear characteristics of the pressure sensor/transducer. Again, while linear characteristics of the pressure sensor/transducer may still exist, but they are no longer dominant enough to allow the non-linear component to be ignored. It should be understood that at certain pressures (5 psi for example in some embodiments), the linear and non-linear characteristics may both be material and should be taken into account in the design and operation of a pressure sensor/transducer. Notably, in current MFCs, non-linearity is considered an undesirable complexity. In the current invention, non-linearity is directly utilized to determine a sensed pressure over a wider range, which is in turn used to calculate flow rates over a wider range.

In existing MFCs designed with transducers intended for use with pressures of 0 to 5 psi, the transducers will be subject to damage and degradation in performance when exposed to pressures of materially over 5 psi. More particularly, a diaphragm of a pressure transducer designed for low pressures will deform and lose shape or fracture when exposed to higher pressures (in some embodiments if pressures exceed 400% of the 1% non-linearity rating, leading to performance issues and pressure measurement inaccuracies. More particularly, conventional MFCs use pressure sensors have an operational limit of 4 times their designed linearity range before being permanently damaged, but are typically not used past 2 times such range to allow a safety factor.

According to the teachings of certain embodiments of the current invention, a single pressure sensor is utilized with a particular operating range in the linear region of performance of its diaphragm. However, in addition to characterizing its output to determine a pressure in response to the performance of the diaphragm in its linear region, its output is additionally characterized to determine a pressure in response to the performance of the diaphragm in its non-linear region as discussed below. In such a manner, a single MFC may replace the performance of multiple MFCs to operate over a wider range of desired mass flows. For example, in the above example, the two mass flow controllers may be replaced by a single mass flow controller capable of measuring 10 to 1000 sccm using a pressure sensor with a linear range of 0.5 to 5 psi and a non-linear range of 5 to 50 psi. In such a single mass flow controller, the ratio of the maximum 1% rated flow to the minimum 1% rated flow is equal to 10 to 1 within the linear range of operation but would increase to 100 to 1 in the non-linear range of operation. In an upstream valve operation, the ratio could increase to 1000 to 1, due to the flow characteristics of compressible flow at higher pressure drops when a control valve is located upstream.

Figure 3A:
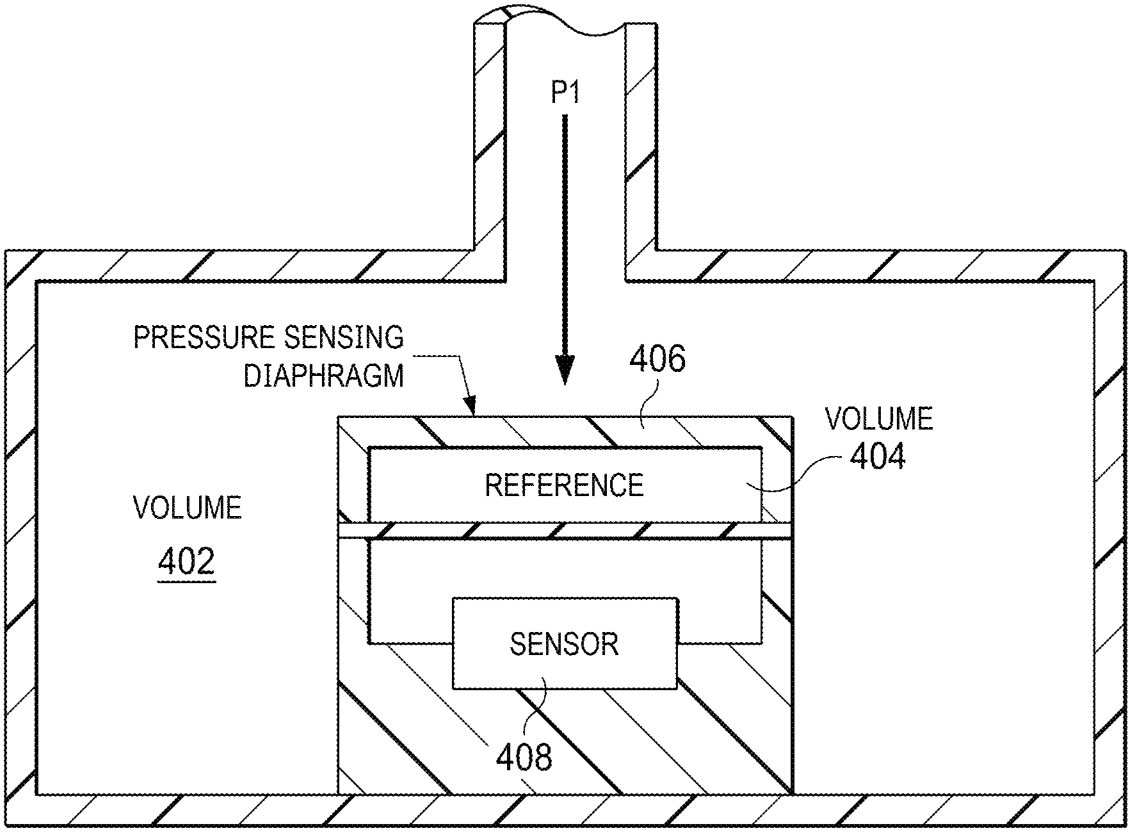
FIGS. 3*a* and 3*b* are illustrations of a pressure sensor in accordance with certain example embodiments.
Figure 3B:
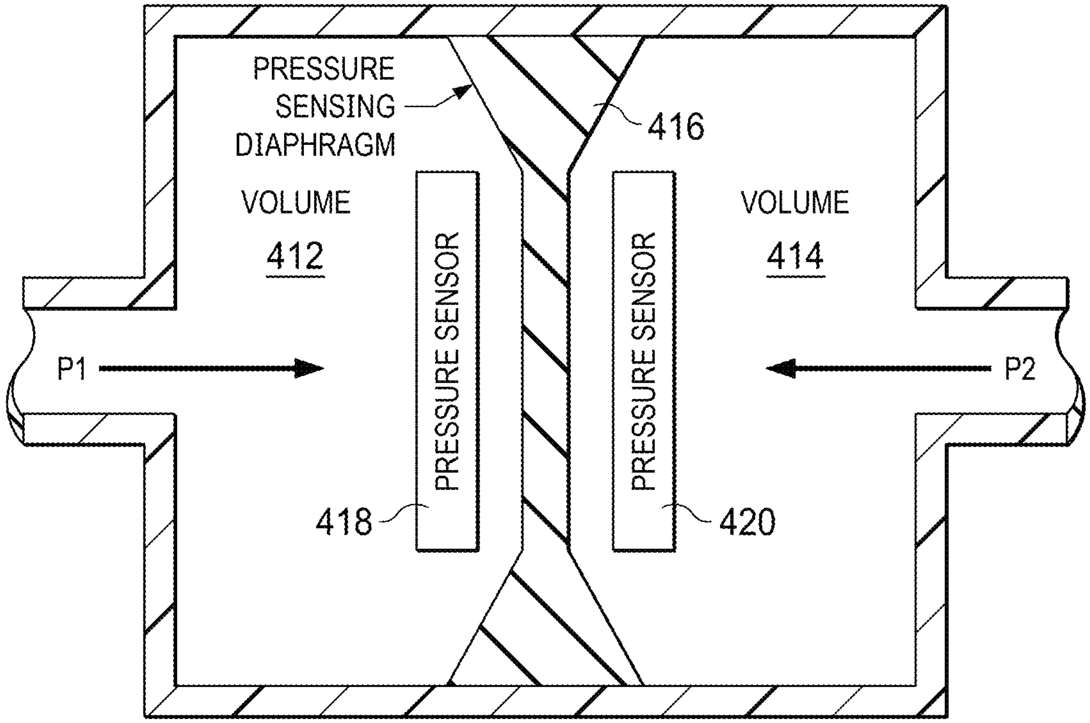

FIGS. 3*a* and 3*b* illustrates schematics of an absolute pressure sensor and a differential pressure sensor respectively. In FIG. 3*a*, a volume 402 is isolated from a volume 404 by a pressure sensing diaphragm 406. It should be noted than diaphragm 406 may be thinner and more flexible and may be tapered and of different widths and thicknesses than is apparent from the illustration thereof. Diaphragm 406 may contain sending elements disposed directly on the surface thereof or integral thereto interfacing or performing part of the functionality of sensor 408. As is well understood in the art, an isolating diaphragm (not illustrated, and not relevant to the teachings of the present 'invention) is typically used to isolate the pressure sensing diaphragm from the corrosive effects of the process fluid. In one embodiment, diaphragm 406 is a ceramic diaphragm selected for its resistance to corrosion in the presence of fluids anticipated to be present during operation of an MFC. Alternatively, diaphragm 406 may be a mono single or poly silicon, germanium, titanium, polythene, metallic, or a composite material with multiple layers of different materials. The selection of such material may depend upon the particular application, the fluids in use, the desired flow range, longevity, flexibility, and elasticity. Such selection may also depend on the technical and economic feasibility of the material for a particular application. For example, while within the scope of the teachings of the present invention, stainless steel and other metals may not economically or technically feasible for the manufacture of small pressure sensors using current manufacturing technology. The dimensions of diaphragm 406 may also be selected based on the foregoing and desired performance characteristics of diaphragm 406. In particular, the thickness and diameter of diaphragm 406 may be manufactured or selected based on the desired pressure range, stiffness, and linear and non-linear characteristics. In an embodiment of the current invention, the diameter of diaphragm 406 used in a pressure sensor is increased and the thickness of the diaphragm is reduced compared prior 5 psi devices. Such changes promote the relative magnitude increase of the non-linear effect relative to the linear component. Such changes also forestall diaphragm damage from the linear component, in each case as compared to a conventional MFC diaphragm, to allow a pressure sensor to operate in the non-linear range without material damage or measurement inaccuracies.

To better understand the foregoing, it is helpful to gain an understanding of the bending and membrane actions. For discussion the simplified case of bending in a beam and membrane action in a cord is used. Both actions are present in the more complicated geometry of a diaphragm deflecting when exposed to pressure on one side of the diaphragm. In reality, diaphragms in mass flow controllers are typically shaped differently than a cord or beam (e.g. with varied cross sections, tapering, curvature, and variable diameter and thickness). However, such a simplification is illustrative of diaphragm linear and non-linear performance. One of ordinary skill in the art will realize that the geometry of a diaphragm will dictate the diaphragm's own unique "bending" (or more accurately, "deflection" when one departs from the simplified beam/cord construct), which will necessarily be more complex than the description below and the illustrated equations due to changes in the geometry of a diaphragm as compared to a simple beam. However, the following description is sufficient to teach the basic principles of linear and non-linear operation and the mechanisms at work in a diaphragm. More particularly, the stiffness to bending of a rectangular beam is proportional to the third power of the thickness ("t") of a beam multiplied by its width ("b").

$$K_{bending} \approx bt^3 \approx t^3. \quad \text{(Eq. 1)}$$

Similarly, the thickness and diameter of diaphragm 406 may be manufactured or selected with its own impacts on range, stiffness and linear and non-linear characteristics.

The stiffness to elongation is proportional to the cross-sectional area of the member.

$$K_{elongation} \approx bt \approx t^1. \quad \text{(Eq. 2)}$$

Cross-sectional area=width "b" *thickness, "t."

The foregoing ignores the membrane effects of a forcer applied to a diaphragm, which are described later below.

The above principles are applied in a sensor 408 coupled to diaphragm 406. In one embodiment sensor 408 is a capacitive sensor. Alternatively, sensor 408 may be a strain gauge, a piezoelectric sensor, a resistive sensor, or any other suitable sensor. In general, deflections in diaphragm 406 cause measurable electrical signals proportionate to the deflection, whether by measuring changes in capacitance, resistance, voltage, current, or other electrical, electromechanical, or electromagnetic property.

With respect to the operation of FIG. 3*a*, the introduction of a fluid into volume 402 will exert a force on diaphragm 406. The higher the pressure in volume 402 is relative to the reference pressure in volume 406, the higher the force that will be exerted on diaphragm 406. Depending on the properties, dimensions, and other characteristics of diaphragm 406, such force will result in a deflection of diaphragm 406. The magnitude of such deflection is measured by sensor 408 and for a particular range of force (corresponding to a particular range of pressures in volume 402), is generally linear. In other words, an increase in force will generally cause an increase in how much diaphragm 406 deflects. Initially, such increase shall occur according to a linear relationship between the two variables, which can be measured by sensor 408. Such a linear relationship is important to the operation of pressure sensors in mass flow controllers for the purpose of monitoring pressure and thereby determining flow rate as described above. For examples, in implementing pressure sensors for appropriate flow ranges, tables may be utilized to store data used to plot linear x and y relationships between the magnitude of such deflection and the amount of pressure applied to sensor 408.

As deflection of a diaphragm increases, such increase shall increasingly occur due to a non-linear relationship between force and deflection. Currently, MFC's do not utilize pressure sensors that are designed to allow operation into the highly non-linear range due to the damage issues described above, and most commercial pressure sensors have an overpressure limit of 3 or 4 times the designed linearity range. In various embodiments of the disclosed invention, MFCs can be utilized that exceed 20 times the designed linearity range. In one embodiment of the current invention, a pressure sensor is designed such that the maximum designed deflection of the diaphragm (linear performance region) exceeds the thickness of the diaphragm, where thickness is a thickness of the region of the diaphragm in which deflection occurs. An engineering rule of thumb is that the non-linear component becomes significant when deflection approaches a moderate percentage of the thickness of a diaphragm. In another embodiment of the current invention, a pressure sensor is designed such that the maximum designed deflection of the diaphragm exceeds twice the thickness of the diaphragm. In another embodiment of the current invention, a pressure sensor is designed such that the maximum designed deflection of the diaphragm reaches or exceeds half the thickness of the diaphragm.

In one embodiment of the current invention, a pressure sensor is designed such that the maximum designed deflection of the diaphragm reaches or exceeds the thickness of the diaphragm, where thickness is a thickness of the diaphragm in the region of the diaphragm in which deflection occurs. In another embodiment of the current invention, a pressure sensor is designed such that the maximum designed deflection of the diaphragm reaches or exceeds twice the thickness of the diaphragm. In yet another embodiment of the current invention, a pressure sensor is designed such that the maximum designed deflection of the diaphragm ranges between half and twice the thickness of the diaphragm.

FIG. 3*b* illustrates the use of a differential pressure sensor 410. A differential pressure sensor may remove sources of error that may be encountered with an absolute pressure sensor. In FIG. 3*b*, a volume 412 is isolated from a volume 414 by a diaphragm 416. In one embodiment, two pressure sensors 418 and 420 may be used in a single housing, such as an absolute pressure sensor 418 and a differential pressure sensor 420. The pressure measurements of pressure sensors 418 and 420 can be used in combination to determine changes in flow rate as discussed above. The discussion above with respect to diaphragm 406 of FIG. 3*a* will also apply to diaphragm 416.

As mentioned previously, the dimensions and other characteristics of a diaphragm in an MFC may be selected based on the particular application, the fluids in use, the desired flow range, maximum used pressure, longevity, flexibility, elasticity, or other desired performance characteristics. One of the most important of such performance characteristics is the desired flow range (the range of flow rates anticipated to be measured and controller by an MFC), and corresponding a range of pressures anticipated to be measured by a sensor such as sensors 408 and 420 or 418. More specifically, a particular diaphragm has historically only been used over a particular range of flow rates because of the need to maintain the linear relationship between pressure and the amount of deflection of the diaphragm. Thus, the performance characteristics of such diaphragm, including, without limitation, the dimensions of such diaphragm, can be selected by a pressure sensor or MFC designer based on the flow range anticipated to be needed by a particular MFC. Outside of such flow range (at pressures below or above the measured pressures corresponding to flow rates measured by the MFC within such flow range), the deflection and physical alteration of the selected diaphragm will no longer follow a linear relationship with pressure. For any diaphragm, there are both linear and non-linear responses as to how the diaphragm reacts to pressure. However, within the intended flow range, the linear response dominates the non-linear response such that in aggregate a linear or first order relationship (such as may be stored in a table in the memory of an MFC) still dominates when measuring how the diaphragm changes when pressure changes. The limited range of a diaphragm is a key design limitation for MFCs. Since linear performance is only possible over a certain range of pressures and therefore flow rates, a particular MFC can only be used for certain ranges of flow rates. If wider ranges of performance are required, multiple MFCs must be used (increasing system cost, complexity, maintenance requirements, and speed of performance) or a different MFC must be substituted for a different flow range (increasing cost, system down time, and complexity) when needed.

If an MFC is operating outside of its intended flow range, the reading of a sensor such as sensor 408 becomes increasingly influenced by non-linear components of a diaphragm such as diaphragm 406. To better understand this, there are two mechanisms that occur in a diaphragm when it is deflected by a force or pressure The 1st is a deflection mechanism, similar to the bending in beam theory, where deflection is linear with force as discussed above. The 2nd is a stretching mechanism caused by a stretching of the material to accommodate the required growth in length of the centerline of the diaphragm, which is membrane theory and is non-linear. Membrane theory is based on a magnitude dependent on the amount of the "stretch" required and angle of the "stretch". Both deflection and membrane mechanisms are always present, but the membrane effect is not significant within a diaphragm's linear flow range. For small deflections, the geometry of deflecting a flat diaphragm produces minimal "stretch" and the forces resisting the stretching of the membrane are dwarfed by the forces resisting the deflection of the diaphragm. In one embodiment, the sensing diaphragm of a first pressure sensor may operate dominantly in a linear range until the amount of deflection of such sensing diaphragm is greater than 50% of the diaphragm thickness. In another embodiment, the membrane of a second pressure sensor may operate in a linear range until the amount of deflection of such membrane is greater than the diaphragm thickness. After such deflection is exceeded, the non-linear operation of the membrane must be considered.

As the deflection of a diaphragm increases, the incremental "stretch" per unit of deflection grows, and eventually the membrane forces are no longer insignificant compared to the bending forces and induce an increasingly non-linear force verses deflection curve. Initially, the force verses deflection curve is dominated by the linear deflection mechanism. As deflection increases, the non-linear membrane forces increase to become significant. When in the linear region, for simplification, think of the diaphragm as a simple flat beam with fixed supports on each end, when undergoing relatively small deflections due to force at its center. For small loads/deflections, the beam does not need to stretch much to get the deflection and membrane action in minimal. Rather, the diaphragm deflects similar to beam theory where deflection is linear with the force applied.

$$D = K_{Geo} * \text{Force}. \qquad \text{(Eq. 3)}$$

As the deflection increases, the beam stretches at an increasing rate and the membrane force becomes significant causing non-linearities. The physical dimensions of the diaphragm impact the linear and non-linear components of how a diaphragm reacts to a force exerted on it by fluid pressure. In bending theory, the stiffness of a square beam is proportional to the third power of the thickness (or depth, "t") of a beam multiplied by the beam width ("b").

$$K_{bending} \approx bt^3 \approx t^3. \qquad \text{(Eq. 4)}$$

In membrane theory, the stiffness to elongation is proportional to the cross-sectional area of the member. As a diaphragm deflects, the amount of stretch per unit of deflection increases due to the angle of the force vector becomes increasingly non-perpendicular.

$$K_{elongation} \approx bt \approx t^1 \qquad \text{(Eq. 5)}$$

Where, cross-sectional area=width "b" *thickness, "t." As an example, if the thickness of a diaphragm doubles, the membrane effect doubles while the bending contribution increases by 8×. A thicker diaphragm will have a longer linear range but will be approximately 8× stiffer.

When the linear and non-linear reactions of a diaphragm are looked at in combination and expressed mathematically, the force exerted on a diaphragm (the pressure of a fluid in a volume containing the diaphragm) is as follows:

$$P = cy + dy^3 \qquad \text{(Eq. 6)}$$

where $$c = \frac{16}{3(1-\mu^2)}\frac{Eh^3}{a^4} \quad d = \frac{7-\mu}{3(1-\mu)}\frac{Eh}{a^4}$$

Where, P=Pressure and y=Deflection. The rest are fixed values for a specific diaphragm, geometry, and properties of a diaphragm material where a=diameter, h=thickness, E=Youngs Modulus and Mu=Poisson's ratio.

In the present invention, rather than relying on the linear performance characteristics of diaphragm 406 within the traditional designed flow range of an MFC, the measurements of sensor 408 or another pressure sensor described above are used by a processor of an MFC, such as processor 510 described below, to measure the linear performance, the non-linear performance, or a combination of the linear and non-linear performance of diaphragm 406 to determine the pressure of a fluid within volume 402. In one embodiment, both a differential sensor and an absolute sensor form sensor 408.

Figure 4:
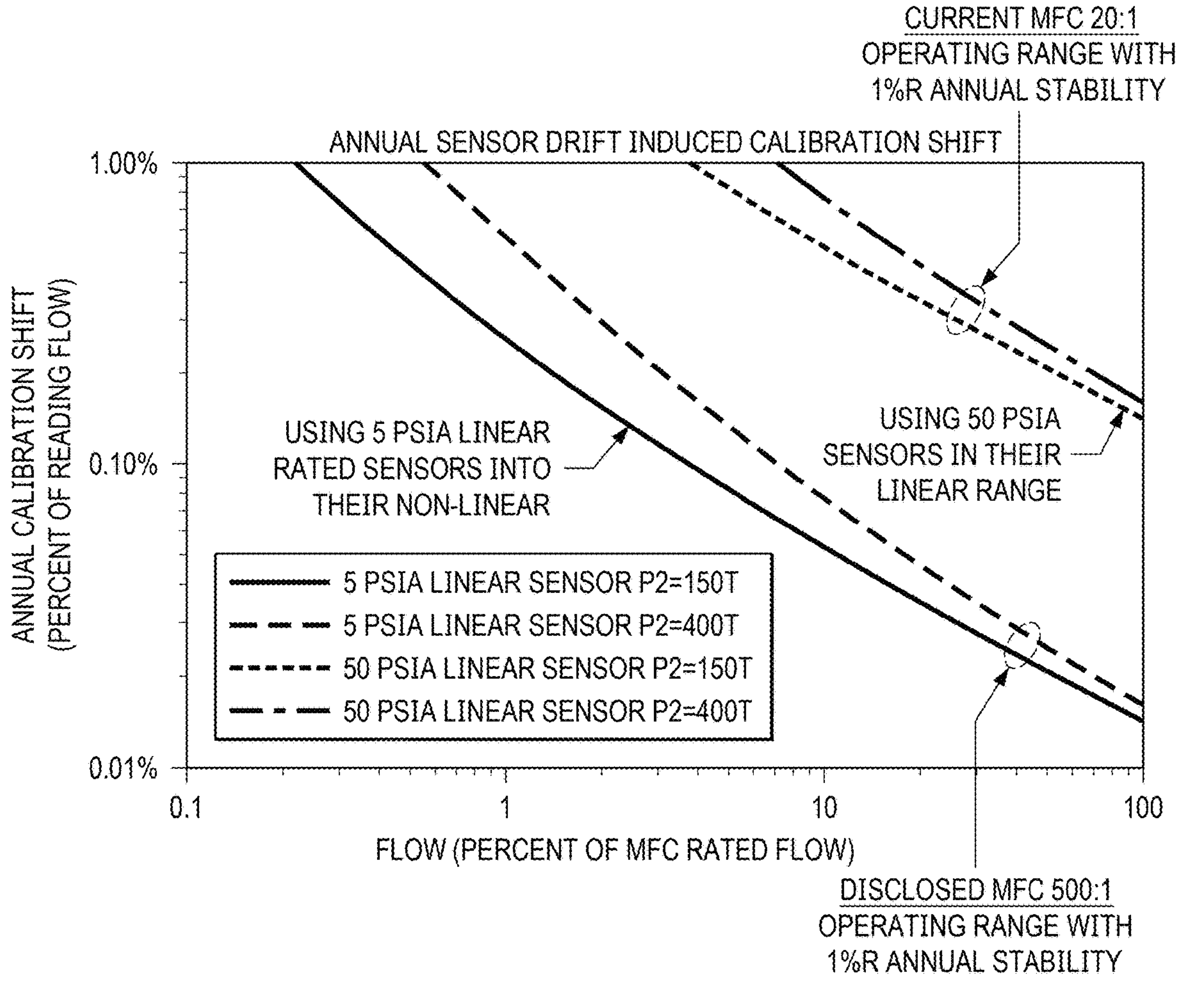
FIG. 4 is an illustration of performance modeling of a prototype MFC, implemented according to one embodiment of the teachings of the present invention, having a dominantly linear range of 0 to 5 psi and a non-linear range of 5 to 60 psi.
Figure 7:
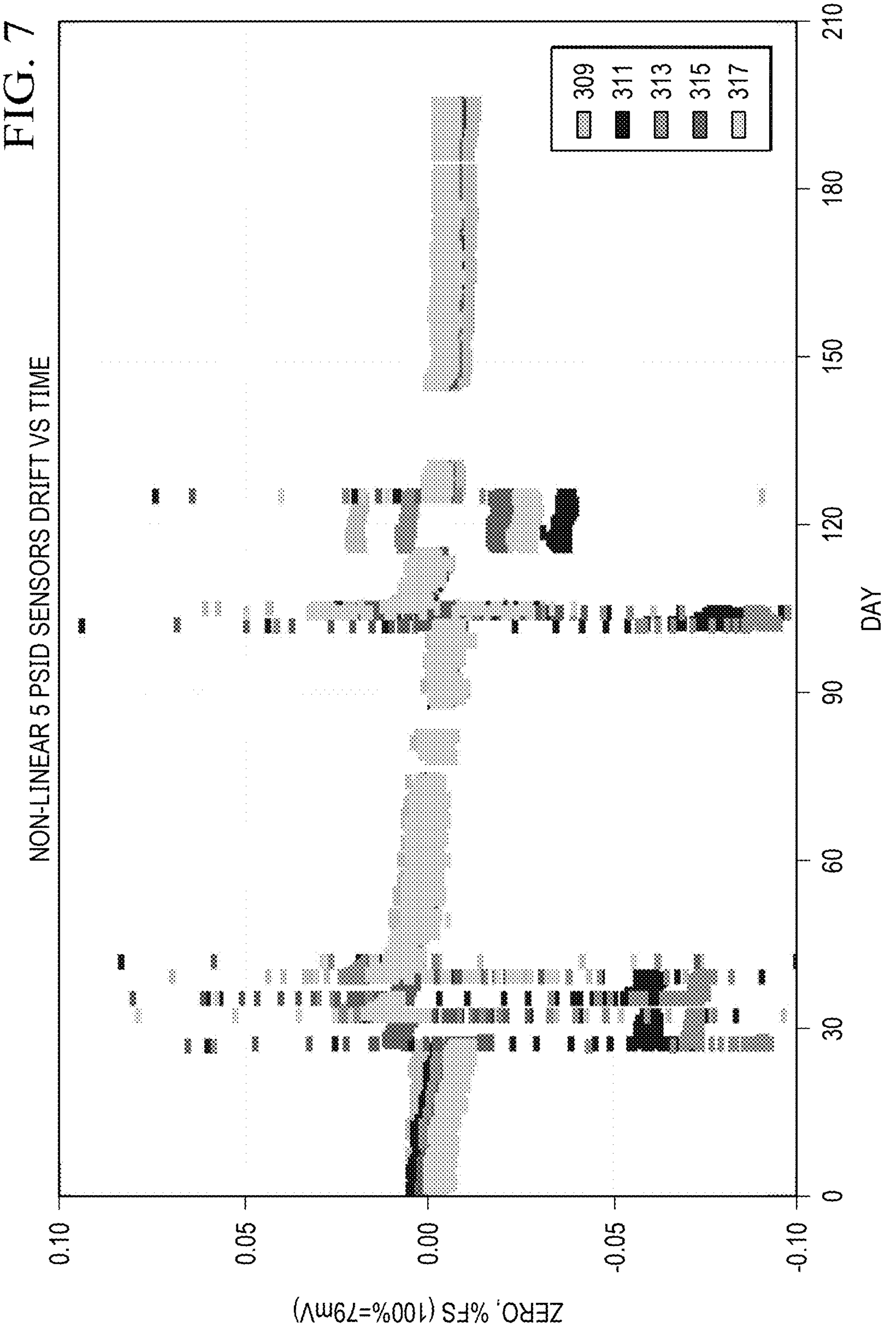
FIG. 7 is an illustration of an aging test of a prototype pressure sensor implemented according to one embodiment of the present invention illustrating it's stability over time.

Referring to FIG. 4, a comparison is presented of a model of an MFC operating in both a linear and non-linear region and a model of a conventional MFC operating only in a linear region. Both models utilize calculations based on compressible flow equations for a laminar flow element. The MFC implemented according to teachings of the present invention has a 1% R error operating range of between 500 to 1 of a designed minimum flow rate while the conventional MFC has an operating range of between 20 to 1 of a designed minimum detectible flow rate. More particularly, FIG. 7 illustrates the magnitude of annual sensor drift. At 100% of rate flow given a maximum inlet pressure of 38 psi, a conventional MFC utilizing a 50-psi 1% best fit straight line conventional PT has an annual sensor drift of 0.05% of linear full scale rating or 0.25 psi/year %, while an MFC utilizing a 5-psi 1% best fit straight line pressure transducer capable of 50 psi operation has an annual sensor drift of 0.025 psi/year, a ten times improvement.

Figure 5:
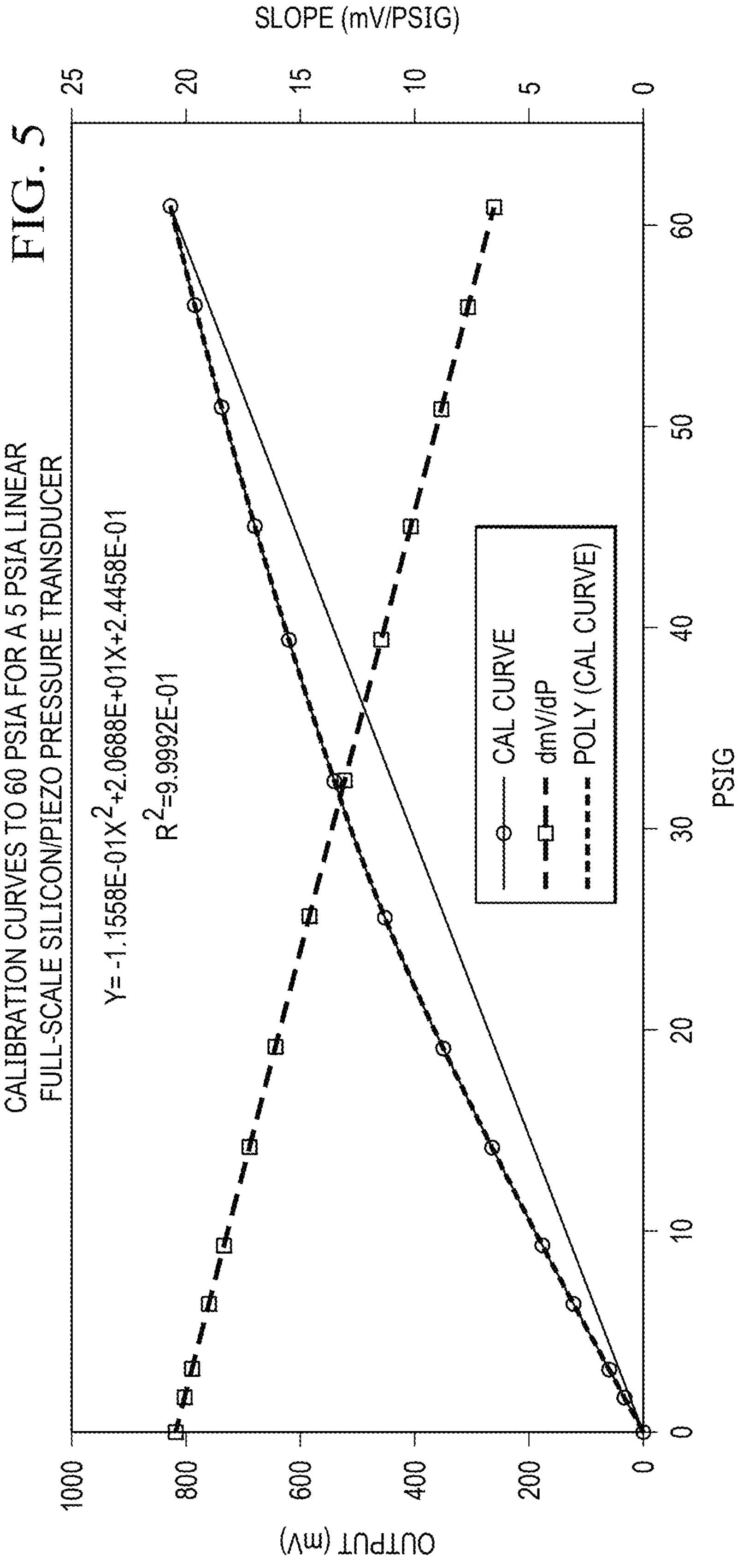
FIG. 5 is an illustration of test data illustrating the performance characteristics (sensor sensitivity and nonlinearity) of a pressure sensor implemented in accordance with one embodiment of the present invention, demonstrating the improved performance of such embodiment when extending the use range of the device into a non-linear region.

Referring to FIG. 5, the testing of a prototype pressure sensor, implemented according to one embodiment of the teachings of the present invention, having a linear range of 0 to 5 psi and a non-linear range of 5 to 60 psi is illustrated. FIG. 5 show a calibration curve and the change in the output of a pressure sensor as compared to the measured pressure in PSI. As illustrated, the performance curves demonstrate the polynomial curve expected from the calculated relationship between pressure and output voltage. The prototype MFC using this pressure sensor therefore demonstrates successful tracking of pressure, and therefor flow rate, far into the non-linear region of operation of the pressure sensor.

Figure 6:
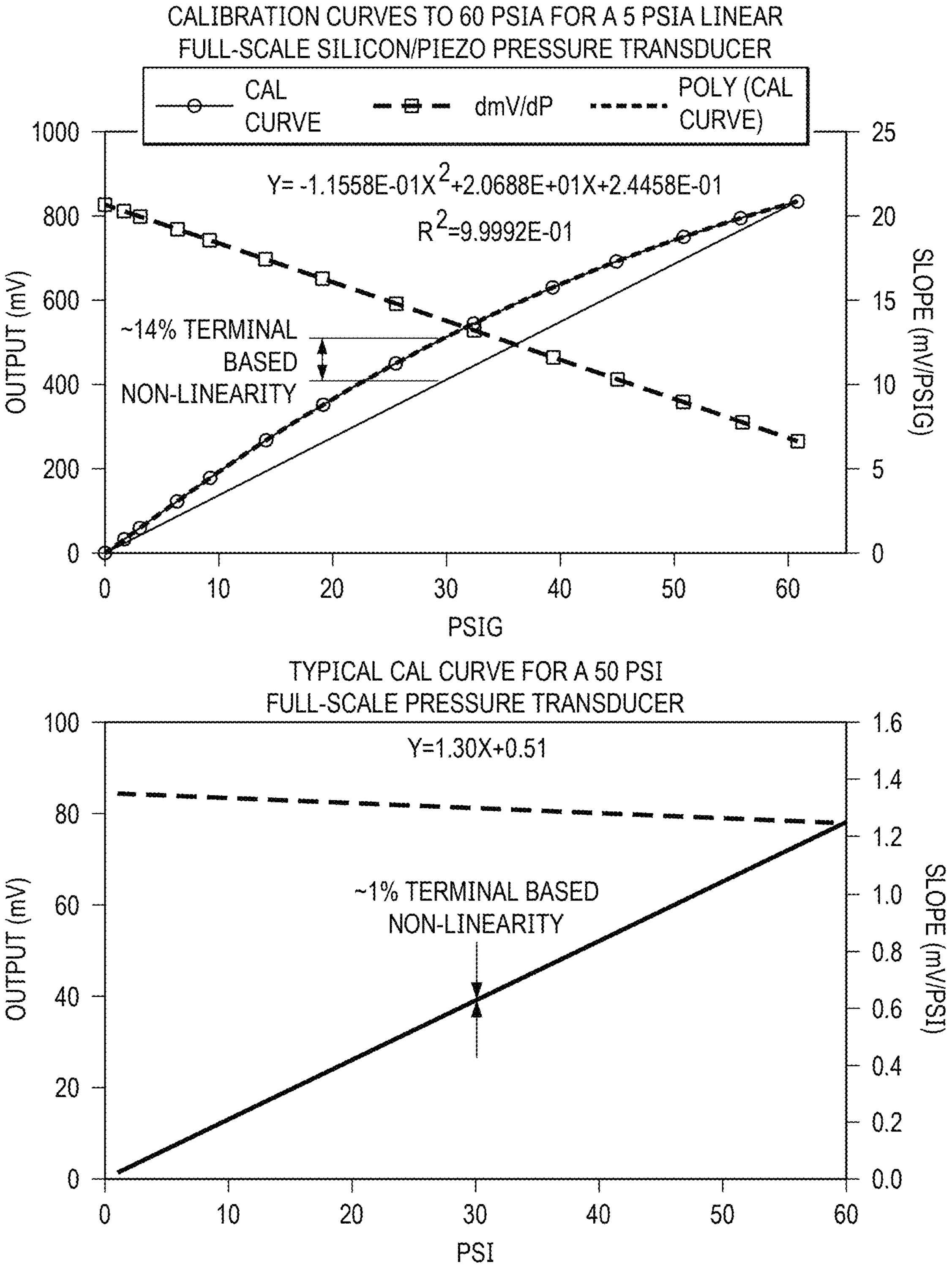
FIG. 6 is an illustration of a comparison of the performance of a conventional sensor used in an MFC to the performance of sensor used an MFC implemented in accordance with one embodiment of the present invention.

Referring to FIG. 6, a comparison of the performance of a conventional sensor used in an MFC to the performance of sensor used an MFC implemented in accordance with one embodiment of the present invention, is illustrated demonstrating the improved performance of such embodiment. As shown, pressure sensitivity (the rate of change in the mV output of the pressure sensor relative to the change in psi) is 4 to 14 times more sensitive in the MFC of the invention across the operating range of 0 to 60 psi. As shown in FIG. 6, the response of the measured voltage at the terminals of the pressure transducer of the MFC implemented according to one embodiment of the current invention (a linear region up to 5 psi and extending into the non-linear range to 60 psi) is 14% non-linear (shown as a 14% departure from a best fit straight line), whereas the measured voltage at the terminals of a standard 50 psi linear pressure transducer is less than 1% non-linear. Tested data demonstrates that embodiments of the current invention show improved sensitivity of performance when used to measure pressures three times greater than the pressures limited to a 1% best fit straight line model and further improved sensitivity of performance when is at least eight times greater. While zero drift (the measured flow rate when a fluid is not flowing) is similar between the pressure sensors in the two MFCs, the sensor sensitivity is still four times more accurate at low pressures such that the zero drift causes less issues in the MFC of the current invention. On an overall basis, the 1% accuracy/stability range of the pressure sensor, and therefore the MFC of the current invention is much improved over the conventional MFC.

Referring to FIG. 7, an aging test of a prototype pressure sensor implemented according to one embodiment of the present invention is illustrated. During the six month test, a linear range 5 psi pressure sensor (capable of use up to 60 psi without material damage) was subjected to varying pressures and temperature changes at certain timeframes as shown. At the end of the six months, drift was less than 0.05% error of it linear full scale. Given that most MFCs are designed to meet specifications at less than 1% error of full scale measurement, the MFC of the present invention operates well within such design constraints. Such testing also verifies the 1% annual stability assumption of FIG. 6.

Figure 8:
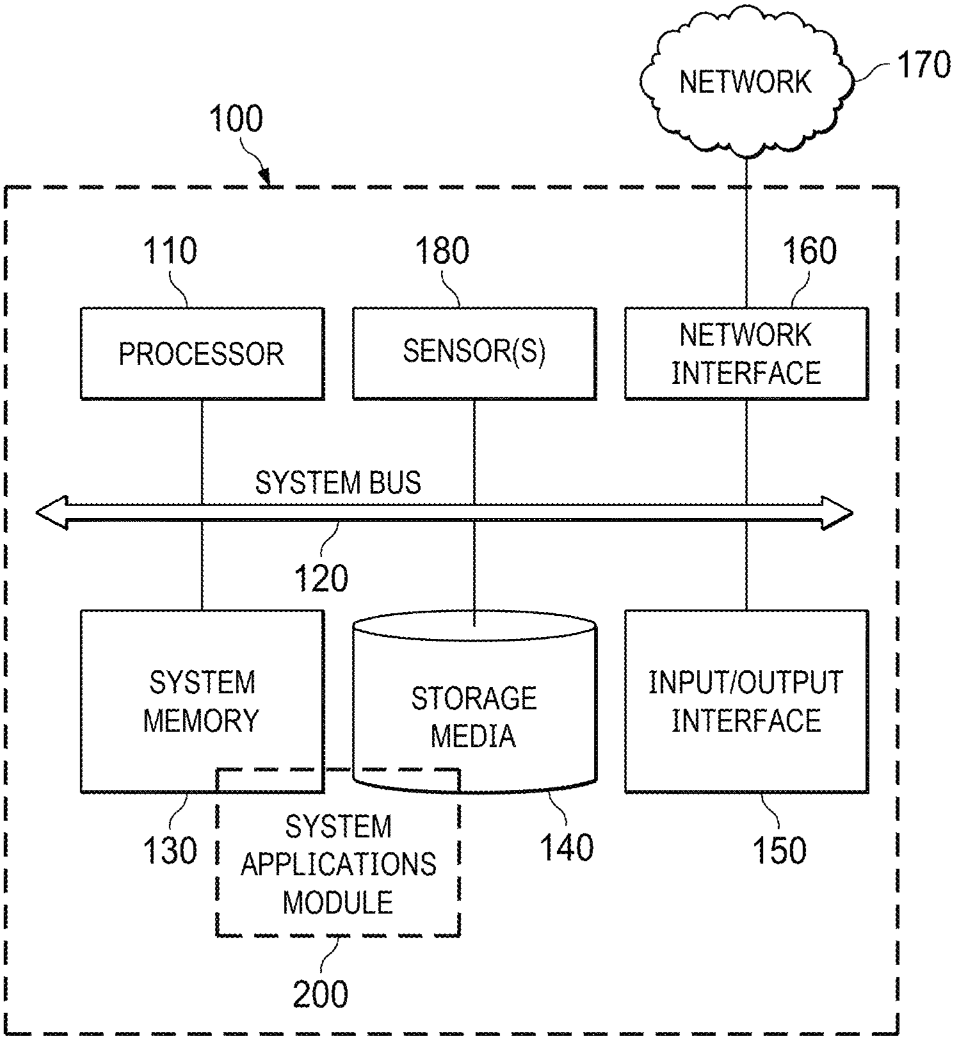
FIG. 8 is an illustration of a computing machine and a system applications module, in accordance with certain example embodiments.

Referring now to FIG. 8, illustrated is a computing machine 500 and a system applications module 600, in accordance with example embodiments. The computing machine 500 can correspond to any of the various computers, mobile devices, laptop computers, Internet of Things (IoT), servers, embedded systems, or computing systems presented herein. The module 600 can comprise one or more hardware or software elements, e.g. other OS application and user and kernel space applications, designed to facilitate the computing machine 500 in performing the various methods and processing functions presented herein. The computing machine 500 can include various internal or attached components such as a processor 510, system bus 520, system memory 530, storage media 540, input/output interface 550, a network interface 560 for communicating with a network 570, e.g. cellular/GPS, Bluetooth, WIFI, or Devicenet, EtherCAT, Analog, RS485, etc., and one or more sensors 580.

The computing machines can be implemented as a conventional computer system, an embedded controller, a laptop, a server, a mobile device, a smartphone, a wearable computer, a customized machine, any other hardware platform, or any combination or multiplicity thereof. The computing machines can be a distributed system configured to function using multiple computing machines interconnected via a data network or bus system.

Processor 510 can be designed to execute code instructions in order to perform the operations and functionality described herein, manage request flow and address mappings, and to perform calculations and generate commands. Processor 510 can be configured to monitor and control the operation of the components in the computing machines. Processor 510 can be a general purpose processor, a processor core, a multiprocessor, a reconfigurable processor, a microcontroller, a digital signal processor ("DSP"), an application specific integrated circuit ("ASIC"), a controller, a state machine, gated logic, discrete hardware components, any other processing unit, or any combination or multiplicity thereof. Processor 510 can be a single processing unit, multiple processing units, a single processing core, multiple processing cores, special purpose processing cores, co-processors, or any combination thereof. According to certain embodiments, processor 510 along with other components of computing machine 500 can be a software based or hardware based virtualized computing machine executing within one or more other computing machines.

The system memory 530 can include non-volatile memories such as read-only memory ("ROM"), programmable read-only memory ("PROM"), erasable programmable read-only memory ("EPROM"), flash memory, or any other device capable of storing program instructions or data with or without applied power. The system memory 530 can also include volatile memories such as random access memory ("RAM"), static random access memory ("SRAM"), dynamic random access memory ("DRAM"), and synchronous dynamic random access memory ("SDRAM"). Other types of RAM also can be used to implement the system memory 530. The system memory 530 can be implemented using a single memory module or multiple memory modules. While the system memory 530 is depicted as being part of the computing machine, one skilled in the art will recognize that the system memory 530 can be separate from the computing machine 500 without departing from the scope of the subject technology. It should also be appreciated that the system memory 530 can include, or operate in conjunction with, a non-volatile storage device such as the storage media 540.

The storage media 540 can include a hard disk, a floppy disk, a compact disc read-only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 540 can store one or more operating systems, application programs and program modules, data, or any other information. The storage media 540 can be part of, or connected to, the computing machine. The storage media 540 can also be part of one or more other computing machines that are in communication with the computing machine such as servers, database servers, cloud storage, network attached storage, and so forth.

The applications module 600 and other OS application modules can comprise one or more hardware or software elements configured to facilitate the computing machine with performing the various methods and processing functions presented herein. The applications module 600 and other OS application modules can include one or more algorithms or sequences of instructions stored as software or firmware in association with the system memory 530, the storage media 540 or both. The storage media 540 can therefore represent examples of machine or computer readable media on which instructions or code can be stored for execution by the processor 510. Machine or computer readable media can generally refer to any medium or media used to provide instructions to the processor 510. Such machine or computer readable media associated with the applications module 600 and other OS application modules can comprise a computer software product. It should be appreciated that a computer software product comprising the applications module 600 and other OS application modules can also be associated with one or more processes or methods for delivering the applications module 600 and other OS application modules to the computing machine via a network, any signal-bearing medium, or any other communication or delivery technology. The applications module 600 and other OS application modules can also comprise hardware circuits or information for configuring hardware circuits such as microcode or configuration information for an FPGA or other PLD. In one exemplary embodiment, applications module 600 and other OS application modules can include algorithms capable of performing the functional operations described by the flow charts (modes of operation) computer systems presented herein.

The input/output ("I/O") interface 550 can be configured to couple to one or more external devices, to receive data from the one or more external devices, and to send data to the one or more external devices. Such external devices along with the various internal devices can also be known as peripheral devices. The I/O interface 550 can include both electrical and physical connections for coupling the various peripheral devices to the computing machine or the processor 510. The I/O interface 550 can be configured to communicate data, addresses, and control signals between the peripheral devices, the computing machine, or the processor 510. The I/O interface 550 can be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 550 can be configured to implement only one interface or bus technology. Alternatively, the I/O interface 550 can be configured to implement multiple interfaces or bus technologies. The I/O interface 550 can be configured as part of, all of, or to operate in conjunction with, the system bus 520. The I/O interface 550 can include one or more buffers for buffering transmissions between one or more external devices, internal devices, the computing machine, or the processor 520.

The I/O interface 520 can couple the computing machine to various input devices including mice, touch-screens, scanners, electronic digitizers, sensors, receivers, touchpads, trackballs, cameras, microphones, keyboards, any other pointing devices, or any combinations thereof. The I/O interface 520 can couple the computing machine to various output devices including video displays, speakers, printers, projectors, tactile feedback devices, automation control, robotic components, actuators, motors, fans, solenoids, valves, pumps, transmitters, signal emitters, lights, and so forth.

The computing machine 500 can operate in a networked environment using logical connections through the NIC 560 to one or more other systems or computing machines across a network. The network can include wide area networks (WAN), local area networks (LAN), intranets, the Internet, wireless access networks, wired networks, mobile networks, telephone networks, optical networks, or combinations thereof. The network can be packet switched, circuit switched, of any topology, and can use any communication protocol. Communication links within the network can involve various digital or an analog communication media such as fiber optic cables, free-space optics, waveguides, electrical conductors, wireless links, antennas, radio-frequency communications, and so forth.

The one or more sensors 580 can be a position sensor and pressure sensors. The pressure sensor can be an Absolute Pressure (P) sensor or a Differential Pressure (DP) sensor. The position sensor can be a capacitive, optical, strain gauge, or magnetic sensor. The sensors 180 can be traditional sensors or semiconductor based sensors.

The processor 510 can be connected to the other elements of the computing machine or the various peripherals discussed herein through the system bus 520. It should be appreciated that the system bus 520 can be within the processor 510, outside the processor 510, or both. According to some embodiments, any of the processors 510, the other elements of the computing machine, or the various peripherals discussed herein can be integrated into a single device such as a system on chip ("SOC"), system on package ("SOP"), or ASIC device.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions unless otherwise disclosed for an exemplary embodiment. Further, a skilled programmer would be able to write such a computer program to implement an embodiment of the disclosed embodiments based on the appended flow charts, algorithms and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

Figure 9:
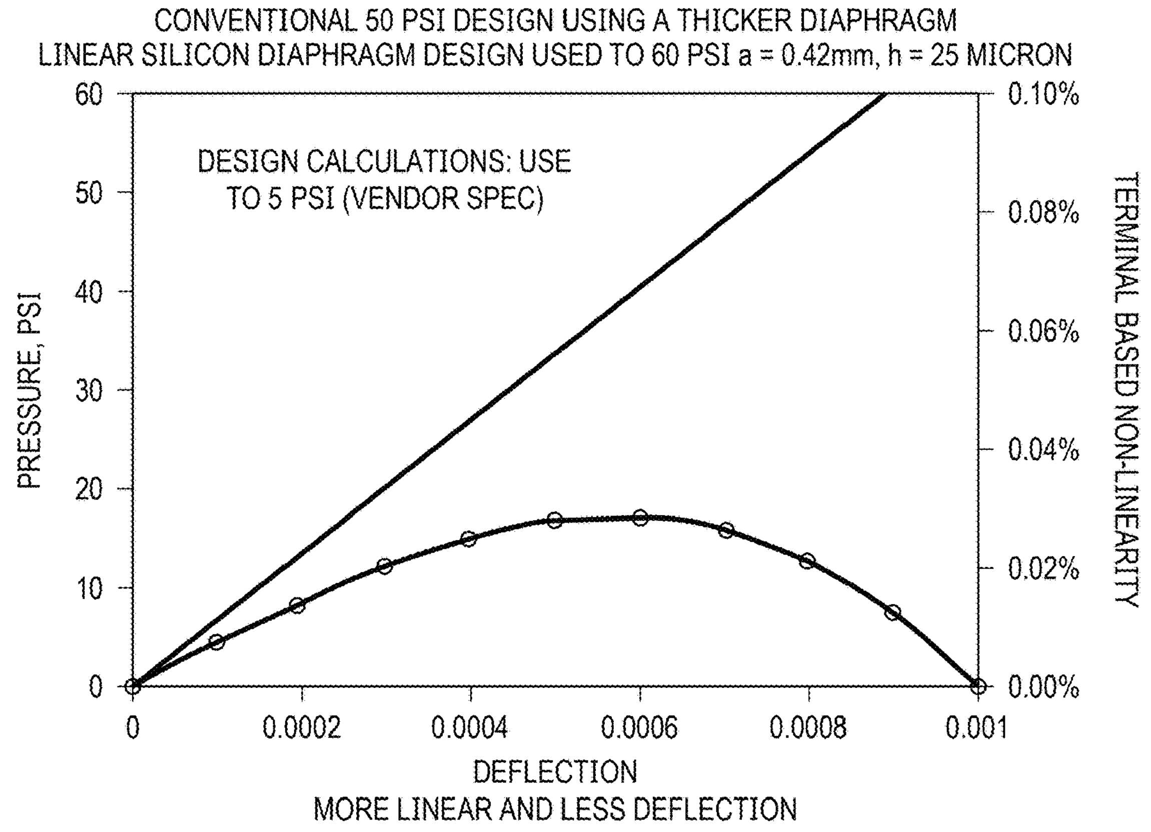
FIG. 9 is an illustration of a comparison of deflection and nonlinearity between a conventional 50 PSI linear region pressure transducer using a thicker 25 micron diaphragm and an embodiment of the current invention's 5 PSI linear region pressure transducer using a thinner 10 micron diaphragm.
Figure 9:
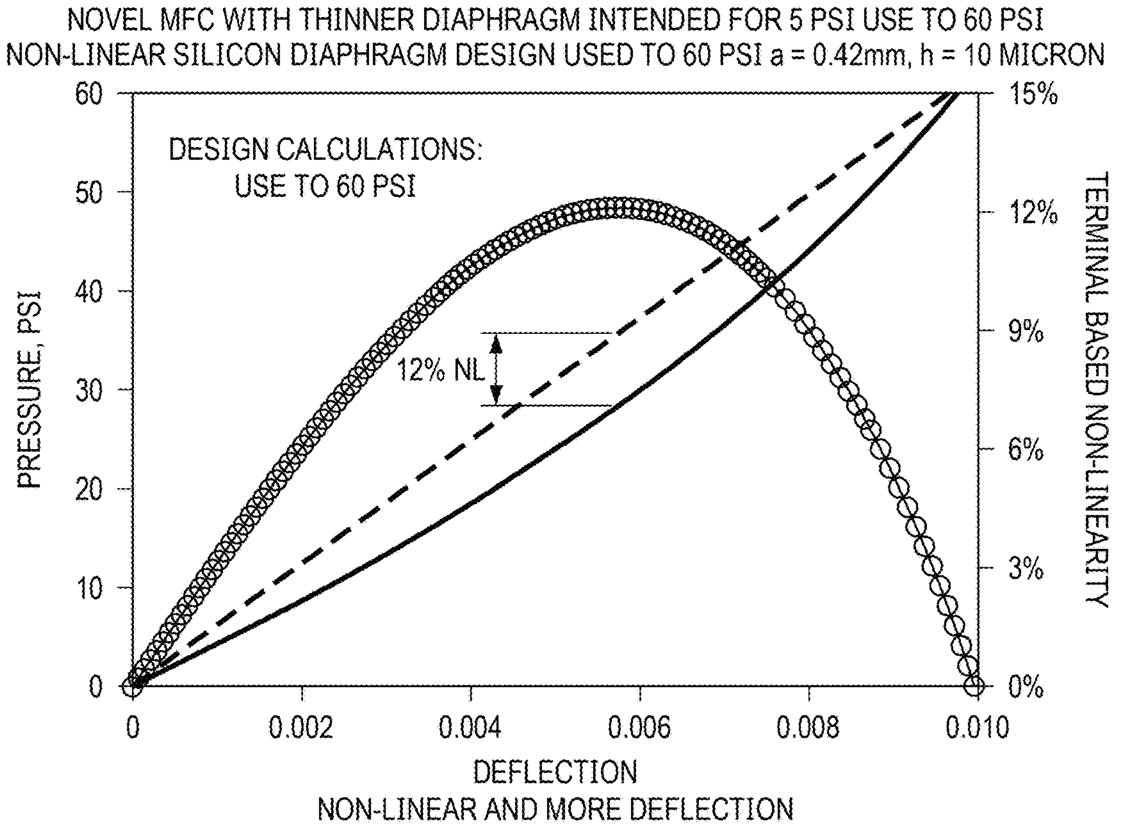

Referring to FIG. 9, a comparison of deflection and nonlinearity between a conventional 50 PSI linear region pressure transducer using a thicker 25 micron diaphragm and an embodiment of the current invention's 5 PSI linear region pressure transducer using a thinner 10 micron diaphragm is illustrated. As shown, nonlinearity during deflection through the pressure range of 0 to 60 PSI in the conventional pressure transducer peaks at around 0.03%. Alternatively, nonlinearity during deflection through the pressure range of 0 to 60 PSI in the non-linear pressure transducer peaks at around 12%. Thus, thinning a diaphragm thickness (thereby increasing both nonlinearity and deflection) can be used to obtain the desired nonlinearity and performance of a particular MFM or MFC. Thinning a diaphragm can also reduce the bending stress level so that larger deflections are possible without device degradation. Referencing the discussion of bending and membrane actions above, bending is a stress riser on the surface of the diaphragm while membrane action stresses the full cross section of the diaphragm. While current manufacturing technology may limit diaphragm thicknesses to 5 microns for many applications, the invention is expected to hold true for even thinner thicknesses of diaphragms. One can also use the diameter of the diaphragm to determine the stiffness of the pressure transducer. Both features can be varied in a transducer design simultaneously.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the description herein.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. The scope of the claims is intended to broadly cover the disclosed embodiments and any such modification. Further, the following clauses represent additional embodiments of the disclosure and should be considered within the scope of the disclosure:

Clause 1, a mass flow meter comprising a flow pathway through the mass flow meter, wherein the flow pathway comprises a first cavity and a second cavity, a laminar flow element adjacent to the first cavity and the second cavity, wherein the first cavity is upstream of the laminar flow element and the second cavity is downstream of the laminar flow element, a pressure transducer positioned in at least one of the first cavity or the second cavity, wherein the pressure transducer includes at least one diaphragm and wherein the pressure transducer measures linear and non-linear responses of the at least one diaphragm to a first pressure to determine a voltage signal indicative of a pressure; and convert the pressure reading obtained from the pressure transducer into a signal indicative of a mass flow rate through the laminar flow element.

Clause 2, the mass flow meter of Clause 1, wherein the mass flow meter communicates with a controller, the controller operable to receive a setpoint signal indicative of a desired flow rate through the laminar flow element; and control a valve drive signal such that the signal indicative of mass flow rate through the laminar flow element substantially matches the received setpoint signal.

Clause 3, the mass flow meter of Clause 1, wherein the diaphragm is rated for a pressure range of 0 to 50 psi.

Clause 4, the mass flow meter of Clause 1, wherein the diaphragm is rated for a linear region of performance at pressures of less than 5 psi and for an increasingly non-linear region of performance at pressures of more than 5 psi.

Clause 5, the mass flow meter of Clause 1, wherein the pressure transducer is rated for pressures of a non-linear performance region of the pressure transducer exceeding five times the pressures of a linear performance region.

Clause 6, the mass flow meter of Clause 2, wherein a control valve is positioned upstream of the first cavity and the mass flow meter uses equations or tables based predominately on $m=K*(P1^2-P2^2)$ to calculate compressible laminar flow, and wherein the control valve drive signal is used to position the control valve.

Clause 7, the mass flow meter of Clause 2, wherein a control valve is positioned upstream of the first cavity and the mass flow meter uses equations predominantly based on $m=K*P1$ to calculate sonic flow, and wherein the control valve drive signal is used to position the control valve.

Clause 8, the mass flow meter of Clause 2, wherein a control valve is positioned downstream of the second cavity and the mass flow meter uses equations predominantly based on $m=K*(P1-P2)/(P1=P2)/2$ to calculate laminar flow, and wherein the control valve drive signal is used to position the control valve.

Clause 9, the mass flow meter of Clause 1, wherein the pressure transducer is an absolute pressure sensor and wherein the mass flow meter further comprises a differential pressure sensor, and wherein the differential pressure sensor includes at least one diaphragm and wherein the differential pressure sensor measures linear and non-linear responses to a difference between a second pressure and a third pressure on each side of the at least one diaphragm to determine a voltage signal indicative of the pressure difference.

Clause 10, the mass flow meter of Clause 1, wherein the pressure transducer comprises a first differential pressure sensor and a second absolute pressure sensor, wherein the first differential pressure sensor and the second absolute pressure sensor measure linear and non-linear responses of one or more diaphragms to determine a voltage signal indicative of the first pressure.

Clause 11, the mass flow meter of Clause 1, wherein the pressure transducer is an first pressure sensor and wherein the mass flow meter further comprises a second absolute pressure sensor, and wherein the absolute pressure sensors each include at least one diaphragm and wherein each absolute pressure sensor measures linear and non-linear responses of the respective at least one diaphragm to the pressure and a second pressure, respectively, to determine a voltage signal indicative of the pressure and the second pressure.

Clause 12, the mass flow meter of Clause 1, wherein the deflection of the diaphragm at a maximum rated use pressure of the pressure transducer is greater than 50% of the thickness of the diaphragm.

Clause 13, the mass flow meter of Clause 1, wherein the deflection of the diaphragm at a maximum rated pressure of the pressure transducer is greater than 100% of the thickness of the diaphragm.

Clause 14, the mass flow meter of Clause 1, wherein the deflection of the diaphragm at a maximum rated pressure of the pressure transducer is greater than 200% of the thickness of the diaphragm.

Clause 15, the mass flow meter of Clause 1, wherein the mass flow meter is configured to measure pressures in non-linear regions of the pressure transducer wherein nonlinearity performance is three times the 1% best fit straight line model.

Clause 16, the mass flow meter of Clause 1, wherein the mass flow meter is configured to measure pressures in non-linear regions of the pressure transducer wherein nonlinearity performance is eight times the 1% best fit straight line model.

What is claimed is:

1. A mass flow meter comprising:

a flow pathway through the mass flow meter, wherein the flow pathway comprises a first cavity and a second cavity, a laminar flow element adjacent to the first cavity and the second cavity, wherein the first cavity is upstream of the laminar flow element and the second cavity is downstream of the laminar flow element, wherein the laminar flow element produces full scale flow at a predetermined upper pressure;

a pressure transducer positioned in at least one of the first cavity or the second cavity, wherein the pressure transducer includes at least one diaphragm and wherein the pressure transducer measures responses of the at least one diaphragm to a first pressure to determine a voltage signal indicative of a pressure, the pressure transducer configured to measure responses within a first predetermined pressure range in which linear characteristics of the pressure transducer dominate over non-linear characteristics of the pressure transducer and configured to measure responses within a second predetermined pressure range in which the non-linear characteristics of the pressure transducer are sufficiently significant compared to the linear characteristics, the second predetermined pressure range having an upper limit at the predetermined upper pressure; and convert the pressure reading obtained from the pressure transducer into a signal indicative of a mass flow rate through the laminar flow element.

2. The mass flow meter of claim 1, wherein the mass flow meter communicates with a controller, the controller operable to:

receive a setpoint signal indicative of a desired flow rate through the laminar flow element; and control a valve drive signal such that the signal indicative of mass flow rate through the laminar flow element substantially matches the received setpoint signal.

3. The mass flow meter of claim 2, wherein a control valve is positioned upstream of the first cavity and the mass flow meter uses equations predominantly based on $m=K*(P1^2-P2^2)$, wherein P1 is a pressure within the first cavity and P2 is a pressure within the second cavity, to calculate compressible laminar flow, and wherein the control valve drive signal is used to position the control valve.

4. The mass flow meter of claim 2, wherein a control valve is positioned upstream of the first cavity and the mass flow meter uses equations predominantly based on $m=K*P1$, wherein P1 is a pressure within the first cavity, to calculate sonic flow, and wherein the control valve drive signal is used to position the control valve.

5. The mass flow meter of claim 2, wherein a control valve is positioned downstream of the second cavity and the mass flow meter uses equations predominantly based on $m=K*(P1-P2)/(P1-P2)/2)$, wherein P1 is a pressure within the first cavity and P2 is a pressure within the second cavity, to calculate laminar flow, and wherein the control valve drive signal is used to position the control valve.

6. The mass flow meter of claim 1, wherein the diaphragm is rated for a pressure range of 0 to 50 psi.

7. The mass flow meter of claim 1, wherein the diaphragm is rated for a linear region of performance at pressures of less than 5 psi and for a predominantly non-linear region of performance at pressures of more than 5 psi.

8. The mass flow meter of claim 1, wherein the pressure transducer is rated for pressures of a non-linear performance region of the pressure transducer exceeding twenty times the pressures of a linear performance region.

9. The mass flow meter of claim 1, wherein the pressure transducer is an absolute pressure sensor and wherein the mass flow meter further comprises a differential pressure sensor, and wherein the differential pressure sensor includes at least one diaphragm and wherein the differential pressure sensor measures responses to a difference between a second pressure and a third pressure on each side of the at least one diaphragm to determine a voltage signal indicative of the pressure difference, the differential pressure sensor configured to measure responses within a third predetermined pressure range in which linear characteristics of the differential pressure sensor dominate over non-linear characteristics of the differential pressure sensor and configured to measure responses within a fourth predetermined pressure range in which the non-linear characteristics of the differential pressure sensor are sufficiently significant compared to the linear characteristics.

10. The mass flow meter of claim 1, wherein the pressure transducer comprises a first differential pressure sensor and a second absolute pressure sensor, wherein the first differential pressure sensor and the second absolute pressure sensor are configured to measure the responses within the first predetermined pressure range and the second predetermined pressure range of the at least one diaphragm to determine the voltage signal indicative of the first pressure.

11. The mass flow meter of claim 1, wherein the pressure transducer is a first absolute pressure sensor and wherein the mass flow meter further comprises a second absolute pressure sensor, and wherein the absolute pressure sensors each include at least one diaphragm, wherein the first absolute pressure sensor is configured to measure the responses within the first predetermined pressure range and the second predetermined pressure range of the respective diaphragm to the pressure, and the second absolute pressure sensor is configured to measure the responses within a third predetermined pressure range and a fourth predetermined pressure range of the respective diaphragm to the second pressure, respectively, to determine a voltage signal indicative of the pressure and the second pressure.

12. The mass flow meter of claim 1, wherein the deflection of the diaphragm at a maximum rated use pressure of the pressure transducer is greater than 50% of the thickness of the diaphragm.

13. The mass flow meter of claim 1, wherein the deflection of the diaphragm at a maximum rated pressure of the pressure transducer is greater than 100% of the thickness of the diaphragm.

14. The mass flow meter of claim 1, wherein the deflection of the diaphragm at a maximum rated pressure of the pressure transducer is greater than 200% of the thickness of the diaphragm.

15. The mass flow meter of claim 1, wherein the mass flow meter is configured to measure pressures in non-linear regions of the pressure transducer wherein non-linearity performance is three times the 1% best fit straight line model.

16. The mass flow meter of claim 1, wherein the mass flow meter is configured to measure pressures in non-linear regions of the pressure transducer wherein non-linearity performance is eight times the 1% best fit straight line model.

* * * * *